United States Patent
Goodwin, III et al.

(10) Patent No.: US 6,981,030 B2
(45) Date of Patent: Dec. 27, 2005

(54) PRIVATE DATA PROTECTION METHOD FOR A NETWORK KIOSK

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 912 days.

(21) Appl. No.: 09/727,338

(22) Filed: Nov. 29, 2000

(65) Prior Publication Data
US 2002/0065901 A1  May 30, 2002

(51) Int. Cl.⁷ ............................................. G06F 15/16
(52) U.S. Cl. ....................................... 709/218; 705/1
(58) Field of Search ............................... 709/219, 227, 709/236, 204, 230, 228, 223, 245, 246; 707/100, 707/505, 104; 705/40, 1, 75; 715/513; 713/182; 345/760, 744, 9, 32, 629; 340/825

(56) References Cited

U.S. PATENT DOCUMENTS

| | | | |
|---|---|---|---|
| 5,745,909 A * | 4/1998 | Perlman et al. | 715/513 |
| 5,761,071 A * | 6/1998 | Bernstein et al. | 700/237 |
| 5,945,989 A * | 8/1999 | Freishtat et al. | 345/760 |
| 5,963,925 A * | 10/1999 | Kolling et al. | 705/40 |
| 5,974,455 A * | 10/1999 | Monier | 709/223 |
| 6,016,476 A * | 1/2000 | Maes et al. | 705/1 |
| 6,032,196 A * | 2/2000 | Monier | 709/245 |
| 6,128,624 A * | 10/2000 | Papierniak et al. | 707/104.1 |
| 6,151,609 A * | 11/2000 | Truong | 715/505 |
| 6,295,057 B1 * | 9/2001 | Rosin et al. | 345/744 |
| 6,311,214 B1 * | 10/2001 | Rhoads | 709/217 |
| 6,317,795 B1 * | 11/2001 | Malkin et al. | 709/246 |
| 6,412,008 B1 * | 6/2002 | Fields et al. | 709/223 |
| 6,445,306 B1 * | 9/2002 | Trovato et al. | 340/825.24 |
| 6,460,069 B1 * | 10/2002 | Berlin et al. | 709/201 |
| 6,564,323 B2 * | 5/2003 | Takahashi et al. | 713/182 |
| 6,571,271 B1 * | 5/2003 | Savitzky et al. | 709/200 |
| 6,605,120 B1 * | 8/2003 | Fields et al. | 715/513 |
| 6,662,199 B1 * | 12/2003 | Flight et al. | 707/100 |
| 6,701,350 B1 * | 3/2004 | Mitchell | 709/217 |
| 6,757,869 B1 * | 6/2004 | Li et al. | 715/513 |
| 6,842,767 B1 * | 1/2005 | Partovi et al. | 709/203 |

OTHER PUBLICATIONS

Using SEARCHScript ; www.princeton.edu/search97/doc/srchscr/02_scr.htm.*
PubTeX output Feb. 24, 1999:1456 ; woodstock.wesleyan.edu/sasdoc/saspdf.v7/graph/c05.pdf.*
Customized metadata for Internet information; Dunkel, B.; Soparkar, N.; Weinstein, P.; Knowledge-Based Intelligent Electronic Systems, 1997. KES '97. Proceedings., 1997 First International Conference on , vol.: 2, May 21-23, 1997.*
Agents and the Internet: infrastructure for mass customization; Baker, A.D.; Van Dyke Parunak, H.; Erol, K.; Internet Computing, IEEE , vol.: 3 , Issue: 5 , Sep.-Oct. 1999.*
Bayesian Reliability Modeling For Masked System Lifetime Data—Kuo, Yang (1998) ;merlot.stat.uconn.edu/pub/papers/tr98/tr9810.ps.*
Adaptable Traffic Masking Techniques for Traffic Flow . . . —Timmerman ; usc.edu/pub/csinfo/tech-reports/papers/96-641.ps.Z.*

(Continued)

Primary Examiner—Thong Vu
(74) Attorney, Agent, or Firm—Paul W. Martin

(57) ABSTRACT

A method of protecting private data for a network kiosk which masks entered private data with a symbol. The method includes the steps of determining fields in the web page which contain the private data by the kiosk, and masking the private data by the kiosk.

4 Claims, 3 Drawing Sheets

OTHER PUBLICATIONS

Protocols for Issuing Public-Key Certificates over the Internet—James Gray ; www.cs.ust.hk/~gray/papers/CI-A4.ps.gz.*

WWW Electronic Commerce and Java Trojan Horses—Tygar, Whitten (1996): www.cs.cmu.edu/~tygar/papers/decaf/main.ps.*

Computing Refinable Integrals—Documentation of the Program—Kunoth (1995) www.isc.tamu.edu/iscpubs/9502/ps.*

Free Riding on Gnutella—Adar, Huberman (2000) www.parc.xerox.com/istl/groups/iea/papers/gnutella/Gnutella.pdf.*

The TAMU Security Package: AnOngoing Response to INternet . . . —David Safford (1993) ftp.cso.uiuc.edu/pub/security/coast/unix/sra/TAMU/tamu-security-overview.ps.gz.*

* cited by examiner

PRIVATE DATA PROTECTION METHOD FOR A NETWORK KIOSK

BACKGROUND OF THE INVENTION

The present invention relates to self-service kiosks and more specifically to a private data protection method for a network kiosk.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

One problem with public use of a network kiosk is that private information may be compromised to others in the vicinity of the kiosk. For example, during the purchase of an item using the kiosk, a user must enter a credit card number to complete payment. Others near the kiosk may see the credit card number.

One solution to the problem is to put a private cubicle or other structure around the kiosk. Such structures can be costly. They can also diminish the kiosk's ability to attract people to use it.

Therefore, it would be desirable to provide a method of protecting private data, such as credit card numbers, for a network kiosk which obviates the need for a shielding structure.

SUMMARY OF THE INVENTION

In accordance with the teachings of the present invention, a private data protection method for a network kiosk is provided.

The method includes the steps of determining fields in the web page which contain the private data by the kiosk, and masking the private data by the kiosk.

It is accordingly an object of the present invention to provide a private data protection method for a network kiosk.

It is another object of the present invention to mask each character of entered private data with a symbol.

It is another object of the present invention to protect credit card numbers and other private data by displaying mask characters instead.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
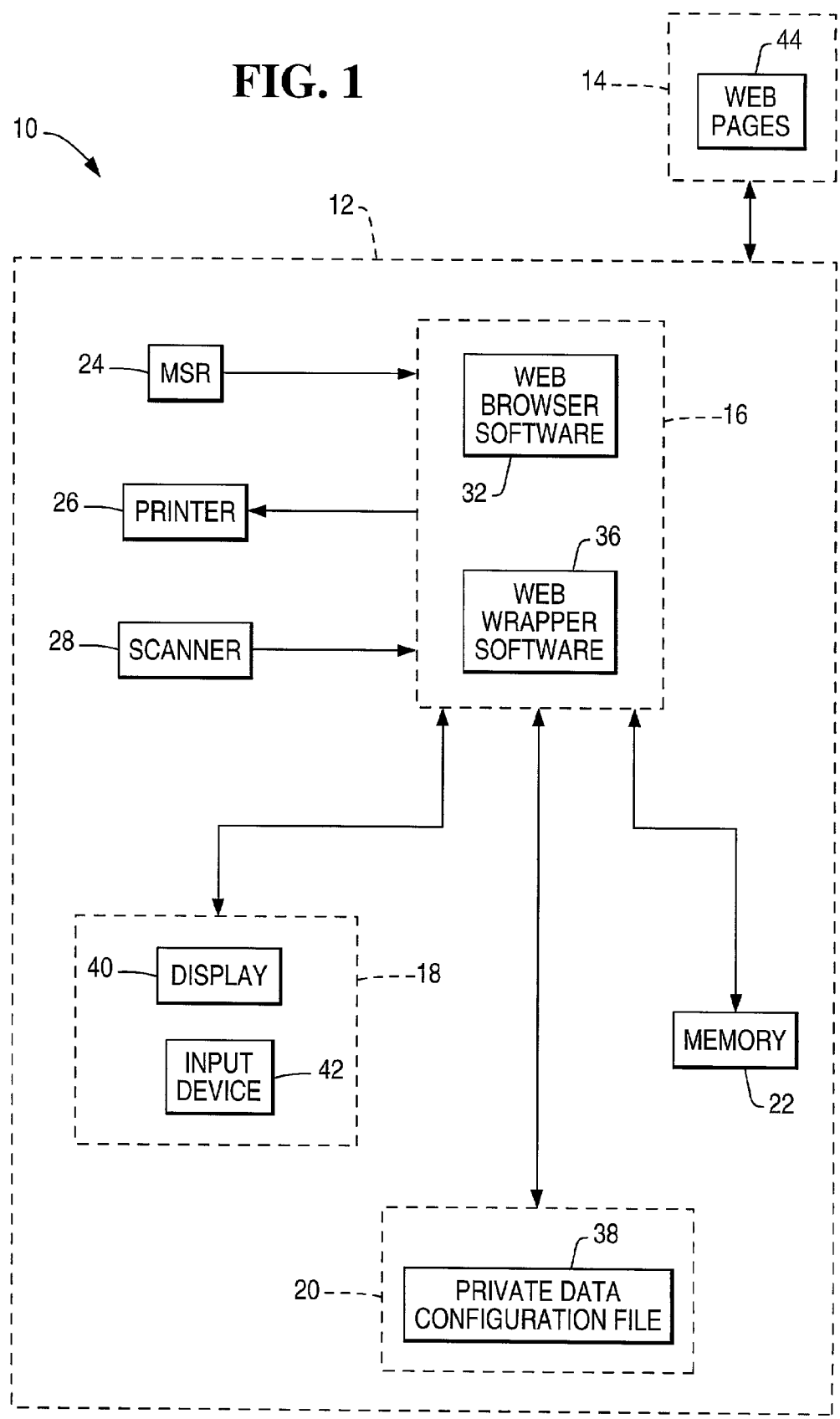
FIG. 1 is a block diagram of a transaction processing system including a network kiosk.

Turning now to FIG. 1, transaction system 10 includes kiosk 12 and server 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32 and web wrapper software 36.

Web browser software 32 allows an operator to access information and purchase products from retailers through network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "–k" command line option. This option hides toolbars and menubars to prevent operator access to those functions.

Web browser software 32 retrieves and displays web pages 44 from network 14, which includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Under the present invention, web wrapper software 36 additionally determines whether a displayed web page contains private data fields. Web wrapper software 36 masks any private data entered into the private data fields by an operator.

Touch screen 18 includes display 40 and input device 42. Display 40 and input device 42 may also be separate units. Input device 42 may record personal information from an operator.

Memory 20 is used by processor 16 to store executed program information, including web wrapper software information.

Storage medium 22 stores software including web wrapper software 36.

MSR 24 reads loyalty, credit, debit, SMART, and/or other types of cards carried by an operator. MSR 24 may record personal information from an operator.

Printer 26 prints information from web wrapper software 32, including information on web pages 44 from server 14. For example, printer 26 may print information relevant to a transaction completed by an operator using kiosk 12.

Scanner 28 reads bar codes on products to obtain product identification numbers. Kiosk 12 queries a transaction server with the identification numbers to obtain information about the product and displays the information.

Figure 2:
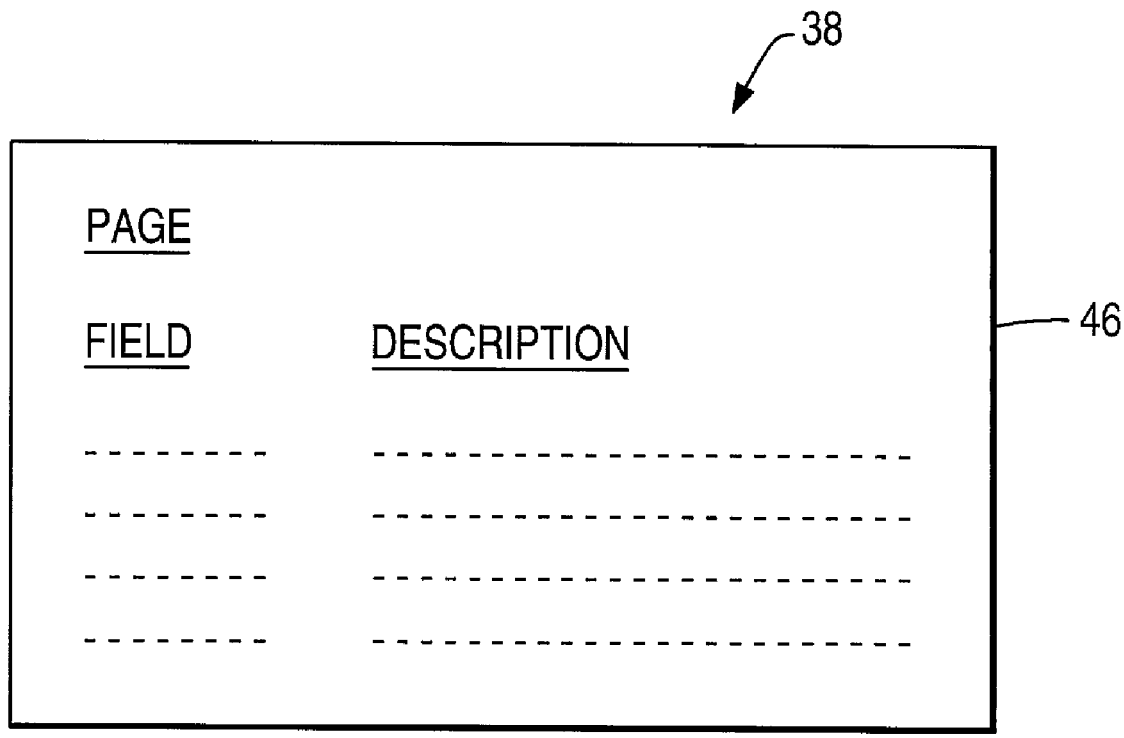
FIG. 2 is a depiction of a private data configuration file.

Turning now to FIG. 2, private data configuration file 38 includes records for each page in which private data may be entered. Each record includes entries PAGE, FIELD, and DESCRIPTION.

Entry PAGE identifies a particular web address or Uniform Resource Locator (URL) for a web page which contains fields requiring private data.

Entry FIELD identifies particular fields which requires private data. An example field would be a field which requires a credit card number.

Entry DESCRIPTION describes the private data associated with the listed fields. This entry assists the kiosk owner in managing protection of private data.

Web wrapper software 36 compares an address of a displayed web page with entries PAGE in private data configuration file 38 to determine whether the address is listed. If the address is listed, web wrapper software 36 reads record 46 for the web page to determine which fields require private data. If the operator enters private data into the fields, web wrapper software 36 masks the private data.

Figure 3:
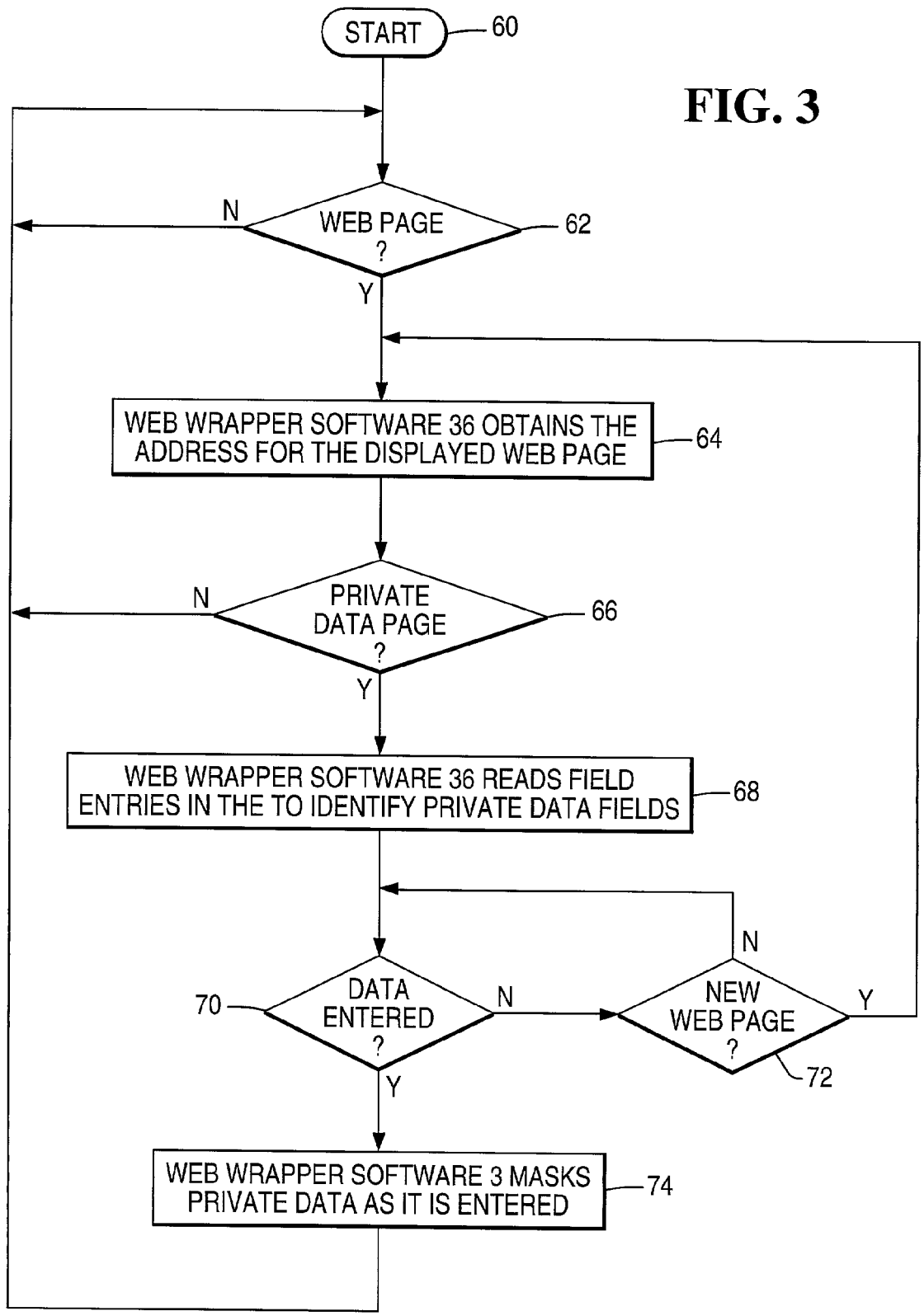
FIG. 3 is a flow diagram illustrating the access limitation method of the present invention.

Turning now to FIG. 3, the method of the present invention is illustrated beginning with START 60.

In step 62, web wrapper software 36 waits for a web page to be displayed by web browser software 32.

In step 64, web wrapper software 36 obtains the address for the displayed web page.

In step 66, web wrapper software 36 compares the address to the addresses under entries PAGE in private data configuration file 38. If the address of the web page is in one of the records 46 in private data configuration file 38, operation proceeds to step 68, otherwise operation returns to step 62 to wait for another page to be displayed.

In step 68, web wrapper software 36 reads entries FIELD in the corresponding record to identify all fields in the displayed web page which require private data.

In step 70, web wrapper software 36 determines whether private data has been entered into the fields. If so, operation continues to step 74. Otherwise, operation proceeds to step 72 to wait for another web page to be displayed.

In step 74, web wrapper software 36 masks private data. For example, web wrapper software 36 may mask each character of private data with a "*" symbol as it is entered.

Optionally, the field type may also be changed to 'password', which will automatically cause masking, but this change would require web wrapper software 36 to change HTML code on the fly on the way into web browser software 32.

Operation returns to step 62 to wait for another web page to be displayed.

Although the present invention has been described with particular reference to certain preferred embodiments thereof, variations and modifications of the present invention can be effected within the spirit and scope of the following claims.

We claim:

1. A method of protecting private data of a user entered into a web page displayed by a network kiosk comprising the steps of:
    (a) displaying the web page by the kiosk;
    (b) determining an address of the web page by the kiosk;
    (c) determining that the address is in a table of web page addresses identifying web pages and their fields which accept the private data by the kiosk;
    (d) determining first fields in the one web page from the table by the kiosk;
    (e) determining second fields of the first fields which contain the private data by the kiosk; and
    (f) masking each character of the private data in the second fields with a symbol by the kiosk to prevent the private data from being seen and used by another person.

2. A method of protecting credit card data of a customer entered into a web page displayed by a network kiosk comprising the steps of:
    (a) displaying the web page by the kiosk;
    (b) determining an address of the web page by the kiosk;
    (c) determining that the address is in a table of web page addresses identifying web pages and their fields which accept private data by the kiosk;
    (d) determining first fields in the one web page from the table by the kiosk;
    (e) determining a second field of the first fields which contains the credit card data by the kiosk; and
    (f) masking each character of the credit card data in the second field with a symbol by the kiosk to prevent the private data from being seen and used by another person.

3. A network kiosk comprising:
    a storage medium which stores a table of web page addresses identifying web pages and their fields which accept private data of a user;
    a display which displays a first web page containing the private data; and
    a computer which determines an address of the first web page, determines that the address is in the table, determines first fields in the first web page from the table, determines second fields of the first fields which contain the private data, and causes the display to display a symbol for each character of the private data in the second fields to prevent the private data from being seen and used by another person.

4. The network kiosk of claim 3, wherein the private data includes a credit card number and the fields include a credit card number field.

\* \* \* \* \*